United States Patent
Carlsten (10) Patent No.: US 12,253,373 B2
(45) Date of Patent: Mar. 18, 2025

(54) DETERMINING VEHICLE TURN DIFFICULTY USING OVERHEAD IMAGES

(71) Applicant: Trimble Inc., Sunnyvale, CA (US)

(72) Inventor: Miles Carlsten, Kirkland, WA (US)

(73) Assignee: Trimble Inc., Westminster, CO (US)

(*) Notice: Subject to any disclaimer, the term of this patent is extended or adjusted under 35 U.S.C. 154(b) by 197 days.

(21) Appl. No.: 17/890,573

(22) Filed: Aug. 18, 2022

(65) Prior Publication Data

US 2024/0060784 A1    Feb. 22, 2024

(51) Int. Cl.
| | |
|---|---|
| *G01C 21/34* | (2006.01) |
| *G01C 21/36* | (2006.01) |
| *G06V 10/70* | (2022.01) |
| *G06V 20/10* | (2022.01) |
| *G06V 20/13* | (2022.01) |
| *H04W 4/40* | (2018.01) |

(52) U.S. Cl.
CPC ..... *G01C 21/3461* (2013.01); *G01C 21/3602* (2013.01); *G01C 21/3647* (2013.01); *G06V 10/70* (2022.01); *G06V 20/13* (2022.01); *G06V 20/182* (2022.01); *H04W 4/40* (2018.02)

(58) Field of Classification Search
CPC ............ G01C 21/3461; G01C 21/3602; G01C 21/3647; G06V 10/70; G06V 20/13; G06V 20/182; H04W 4/40
See application file for complete search history.

(56) References Cited

U.S. PATENT DOCUMENTS

| | | | |
|---|---|---|---|
| 6,622,085 B1* | 9/2003 | Amita | G06T 11/203 |
| | | | 340/995.14 |
| 11,131,554 B2* | 9/2021 | Hou | G05D 1/0088 |
| 11,816,981 B2* | 11/2023 | Dulberg | B60W 30/00 |
| 2019/0347821 A1* | 11/2019 | Stein | G06V 20/588 |
| 2020/0208998 A1* | 7/2020 | Xiang | G06F 16/29 |
| 2020/0209002 A1* | 7/2020 | Hou | G06N 20/00 |
| 2020/0210717 A1* | 7/2020 | Hou | G06V 20/588 |
| 2020/0242922 A1* | 7/2020 | Dulberg | G08G 1/096783 |
| 2021/0302186 A1* | 9/2021 | Ikeda | G01C 21/3626 |
| 2022/0089177 A1* | 3/2022 | Wang | B60W 60/001 |
| 2022/0178708 A1* | 6/2022 | Hiromura | G01C 21/3415 |
| 2022/0188867 A1* | 6/2022 | Farmer | H04W 4/029 |
| 2022/0222587 A1* | 7/2022 | Li | G08G 1/096844 |

OTHER PUBLICATIONS

Extended European Search Report for Application No. 23188098.0-1009, date of completion of the search Jan. 22, 2024, 13 pages.

* cited by examiner

*Primary Examiner* — Anil K Bhargava
(74) *Attorney, Agent, or Firm* — Kilpatrick Townsend & Stockton LLP (57) ABSTRACT

Described herein are systems, methods, and other techniques for determining vehicle turn difficulty using overhead satellite imagery. In some implementations, an overhead image of a road intersection is obtained. A footprint of the road intersection is predicted using the overhead image. The footprint of the road intersection is analyzed to calculate one or more distances associated with a turn at the road intersection. A turn difficulty value associated with the turn is calculated based on the one or more distances for the turn.

20 Claims, 10 Drawing Sheets

DETERMINING VEHICLE TURN DIFFICULTY USING OVERHEAD IMAGES

BACKGROUND OF THE INVENTION

Large vehicles serve an important function in the world economy, transporting raw materials to manufacturers, food to supermarkets, everyday goods to local warehouses, among others. Many of these large vehicles may be semi-trailer trucks (or simply "semitrucks"), which may include a combination of a tractor unit with one or more semi-trailers. When generating navigation routes for large vehicles, there exists a complex problem that arises from these vehicles not being able to safely navigate certain sharp turns. For example, to compensate for a vehicle's large turning footprint, a driver of a large vehicle may need to make a much wider turn than a driver of a small vehicle to stay within the boundaries of a road. In many instances, it can be difficult to determine beforehand whether certain vehicles can travel a particular navigation route due to the various turns that must be successfully taken. Methods and techniques are needed for assessing road turning feasibility for large vehicles.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method comprising: obtaining an overhead image of a road intersection; predicting a footprint of the road intersection using the overhead image; analyzing the footprint of the road intersection to calculate one or more distances associated with a turn at the road intersection; and calculating a turn difficulty value associated with the turn based on the one or more distances for the turn.

Example 2 is the method of example(s) 1, further comprising: determining a vehicle route based on a set of turn difficulty values associated with a set of turns at a set of road intersections, wherein the set of turn difficulty values, the set of turns, and the set of road intersections include the turn difficulty value, the turn, and the road intersection, respectively.

Example 3 is the method of example(s) 2, further comprising: wirelessly transmitting the vehicle route or the turn difficulty value to a vehicle.

Example 4 is the method of example(s) 1-3, wherein the turn difficulty value is calculated further based on one or more characteristics of a vehicle.

Example 5 is the method of example(s) 1-4, wherein the footprint of the road intersection is predicted using a trained machine-learning model using the overhead image.

Example 6 is the method of example(s) 1-5, wherein analyzing the footprint of the road intersection to calculate the one or more distances associated with the turn at the road intersection includes: identifying an entry road and an exit road associated with the turn based on the footprint of the road intersection; calculating a set of road vectors based on the footprint of the road intersection, the set of road vectors including a first road vector for the entry road and a second road vector for the exit road; calculating a vertex based on the set of road vectors and the footprint of the road intersection; and fitting a hyperbolic curve based on the set of road vectors and the vertex, the hyperbolic curve having a focus point.

Example 7 is the method of example(s) 6, wherein analyzing the footprint of the road intersection to calculate the one or more distances associated with the turn at the road intersection includes: calculating a vertex-to-focus distance based on the vertex and the focus point, wherein the one or more distances includes the vertex-to-focus distance.

Example 8 is the method of example(s) 6, wherein the one or more distances includes a width of the exit road.

Example 9 is a non-transitory computer-readable medium comprising instructions that, when executed by one or more processors, cause the one or more processors to perform operations comprising: obtaining an overhead image of a road intersection; predicting a footprint of the road intersection using the overhead image; analyzing the footprint of the road intersection to calculate one or more distances associated with a turn at the road intersection; and calculating a turn difficulty value associated with the turn based on the one or more distances for the turn.

Example 10 is the non-transitory computer-readable medium of example(s) 9, wherein the operations further comprise: determining a vehicle route based on a set of turn difficulty values associated with a set of turns at a set of road intersections, wherein the set of turn difficulty values, the set of turns, and the set of road intersections include the turn difficulty value, the turn, and the road intersection, respectively.

Example 11 is the non-transitory computer-readable medium of example(s) 10, wherein the operations further comprise: wirelessly transmitting the vehicle route or the turn difficulty value to a vehicle.

Example 12 is the non-transitory computer-readable medium of example(s) 9-11, wherein the turn difficulty value is calculated further based on one or more characteristics of a vehicle.

Example 13 is the non-transitory computer-readable medium of example(s) 9-12, wherein the footprint of the road intersection is predicted using a trained machine-learning model using the overhead image.

Example 14 is the non-transitory computer-readable medium of example(s) 9-13, wherein analyzing the footprint of the road intersection to calculate the one or more distances associated with the turn at the road intersection includes: identifying an entry road and an exit road associated with the turn based on the footprint of the road intersection; calculating a set of road vectors based on the footprint of the road intersection, the set of road vectors including a first road vector for the entry road and a second road vector for the exit road; calculating a vertex based on the set of road vectors and the footprint of the road intersection; and fitting a hyperbolic curve based on the set of road vectors and the vertex, the hyperbolic curve having a focus point.

Example 15 is the non-transitory computer-readable medium of example(s) 14, wherein analyzing the footprint of the road intersection to calculate the one or more distances associated with the turn at the road intersection includes: calculating a vertex-to-focus distance based on the vertex and the focus point, wherein the one or more distances includes the vertex-to-focus distance.

Example 16 is the non-transitory computer-readable medium of example(s) 14, wherein the one or more distances includes a width of the exit road.

Example 17 is a system comprising: one or more processors; and a computer-readable medium comprising instructions that, when executed by the one or more processors, cause the one or more processors to perform operations comprising: obtaining an overhead image of a road intersection; predicting a footprint of the road intersection using the overhead image; analyzing the footprint of the road intersection to calculate one or more distances associated with a turn at the road intersection; and calculating a turn difficulty value associated with the turn based on the one or more distances for the turn.

Example 18 is the system of example(s) 17, wherein the operations further comprise: determining a vehicle route based on a set of turn difficulty values associated with a set of turns at a set of road intersections, wherein the set of turn difficulty values, the set of turns, and the set of road intersections include the turn difficulty value, the turn, and the road intersection, respectively.

Example 19 is the system of example(s) 18, wherein the operations further comprise: wirelessly transmitting the vehicle route or the turn difficulty value to a vehicle.

Example 20 is the system of example(s) 17-19, wherein the turn difficulty value is calculated further based on one or more characteristics of a vehicle.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

Generating vehicle navigation routes can be problematic when such routes can possibly contain sharp turns that cannot be made by certain large vehicles such as semi-trailer trucks. A conventional approach to this problem is to consider the angles the roads make and to avoid any turns having an angle that is too sharp (i.e., the turn angle is below a threshold). In general, this approach is insufficient— the angle alone does not contain enough information about an intersection to correctly identify which turns can be made and which cannot for a given vehicle. In this case, both false positive and false negative errors can have significant negative effects, i.e., advising a vehicle down a route that leads to an impossible turn presents a serious safety concern (leading to a huge time sink if the vehicle needs to backtrack) and being too aggressive about routing vehicles around "suspected difficult turns" that are not actually difficult can cause inefficiencies in routes. This highlights the need for a more intricate way of describing a turn that can be used to accurately differentiate which turns a given vehicle can make and which it cannot.

Embodiments of the present disclosure solve these and other issues by differentiating between which turns a vehicle can and cannot make based on the interior shape of the turn and/or the width of the road being turned onto. Quantitatively, these properties can be obtained by calculating (1) a distance along the axis that bisects the turning angle that indicates how much inside turning space is available (referred to, in some embodiments, as the "vertex-to-focus distance") and (2) a width of the road being turned onto (referred to, in some embodiments, as the "exit road width"). The vertex-to-focus distance may be calculated by modeling the path of a vehicle through an intersection as a hyperbola having an associated focus point, where the road vectors are used as the asymptotes of the hyperbola, and calculating a vertex where the angle bisector intersects the edge of the road. The vertex-to-focus distance is then found as the distance between the vertex and the focus point. The exit road width may be calculated across the exit road of the turn along an axis that is parallel to and offset from the road vector for the entry road of the turn, as will be described in greater detail below.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
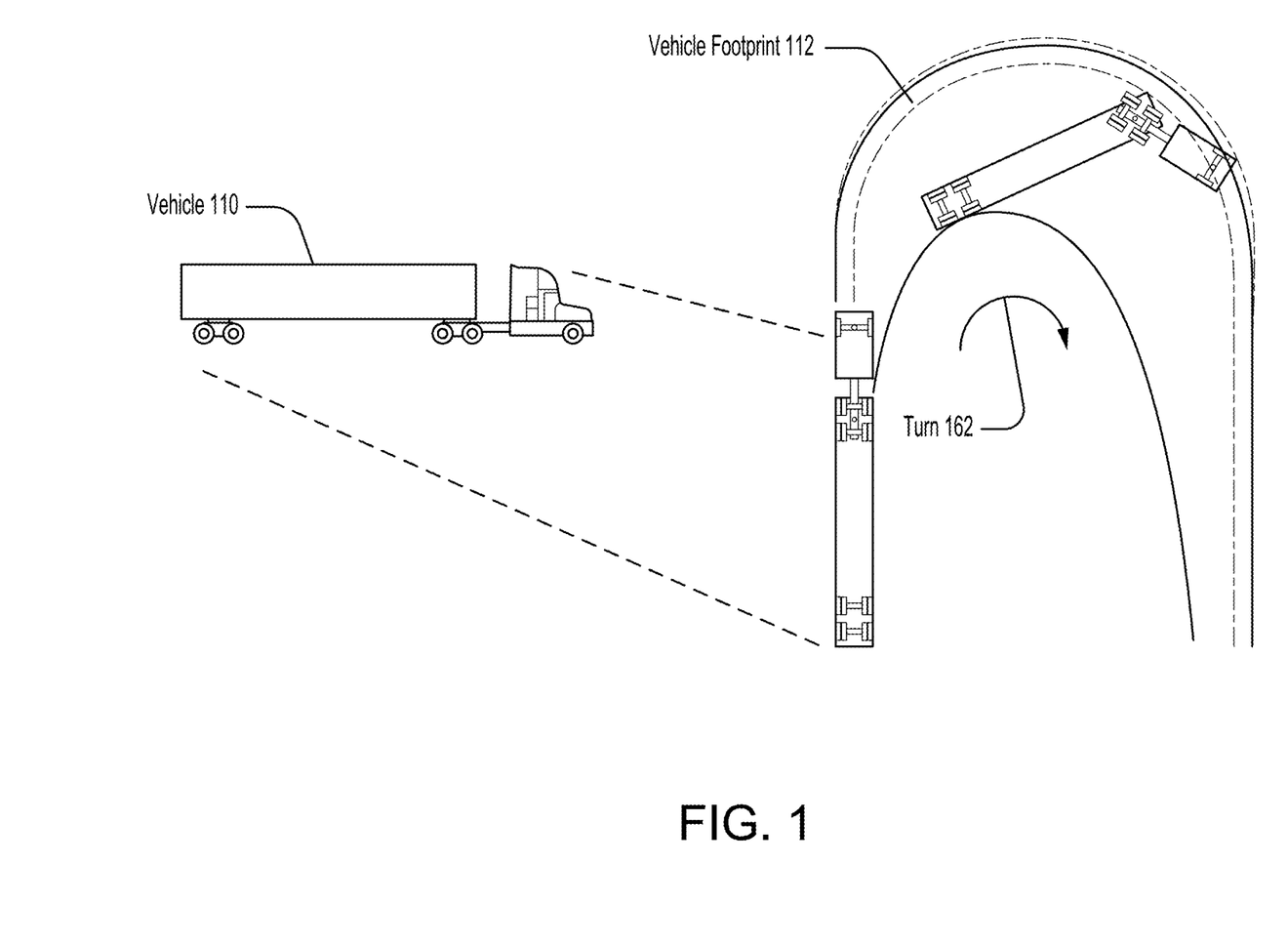
FIG. 1 illustrates an example of a vehicle footprint of a turning vehicle.

FIG. 1 illustrates an example of a vehicle footprint 112 of a turning vehicle, in accordance with some embodiments of the present disclosure. In the illustrated example, a vehicle 110 is making a turn 162 where the turn angle is 0°, the turn angle being defined as the angle between the vector of the entry road and the vector of the exit road associated with turn 162. As shown in FIG. 1, vehicle footprint 112 is larger due to the trailer unit of vehicle 110 not following the same path as the tractor unit of vehicle 110, and instead taking a shorter path closer to the inside of the turn. The size and shape of vehicle footprint 112 can vary based on the length of vehicle 110, the width of vehicle 110, the relative lengths of the tractor and trailer units of vehicle 110, the positions of the axles of vehicle 110, among other factors.

Figure 2A:
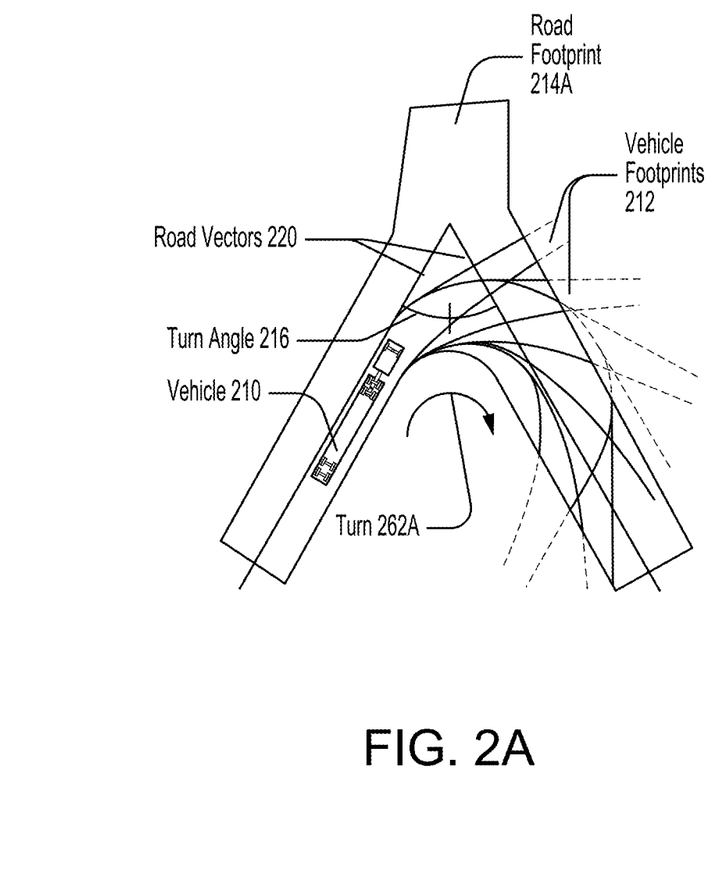
FIGS. 2A and 2B illustrates examples of two turns having similar turn angles but different road footprints.
Figure 2B:
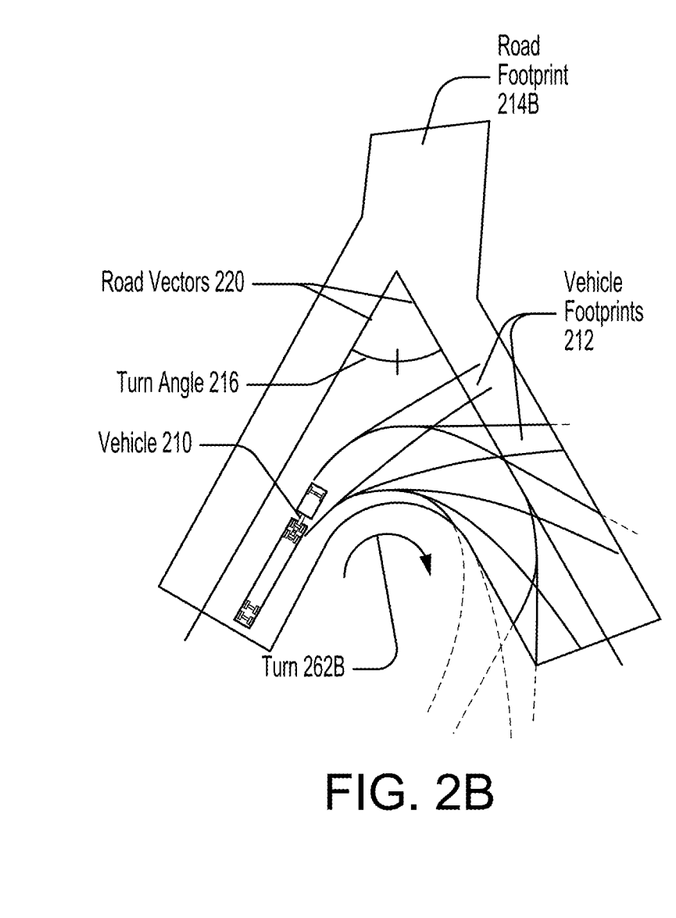

FIGS. 2A and 2B illustrates examples of two turns 262 having similar turn angles 216 but different road footprints 214, in accordance with some embodiments of the present disclosure. In FIG. 2A, a vehicle 210 is unable to successfully complete turn 262A since none of the possible vehicle footprints 212 can fit within road footprint 214A. In FIG. 2B, vehicle 210 is able to successfully complete turn 262B since at least one of vehicle footprints 212 can fit within road footprint 214B. FIGS. 2A and 2B demonstrate how turn difficulty cannot be properly assessed based on turn angle alone, and that other factors may need to be considered.

Figure 3:
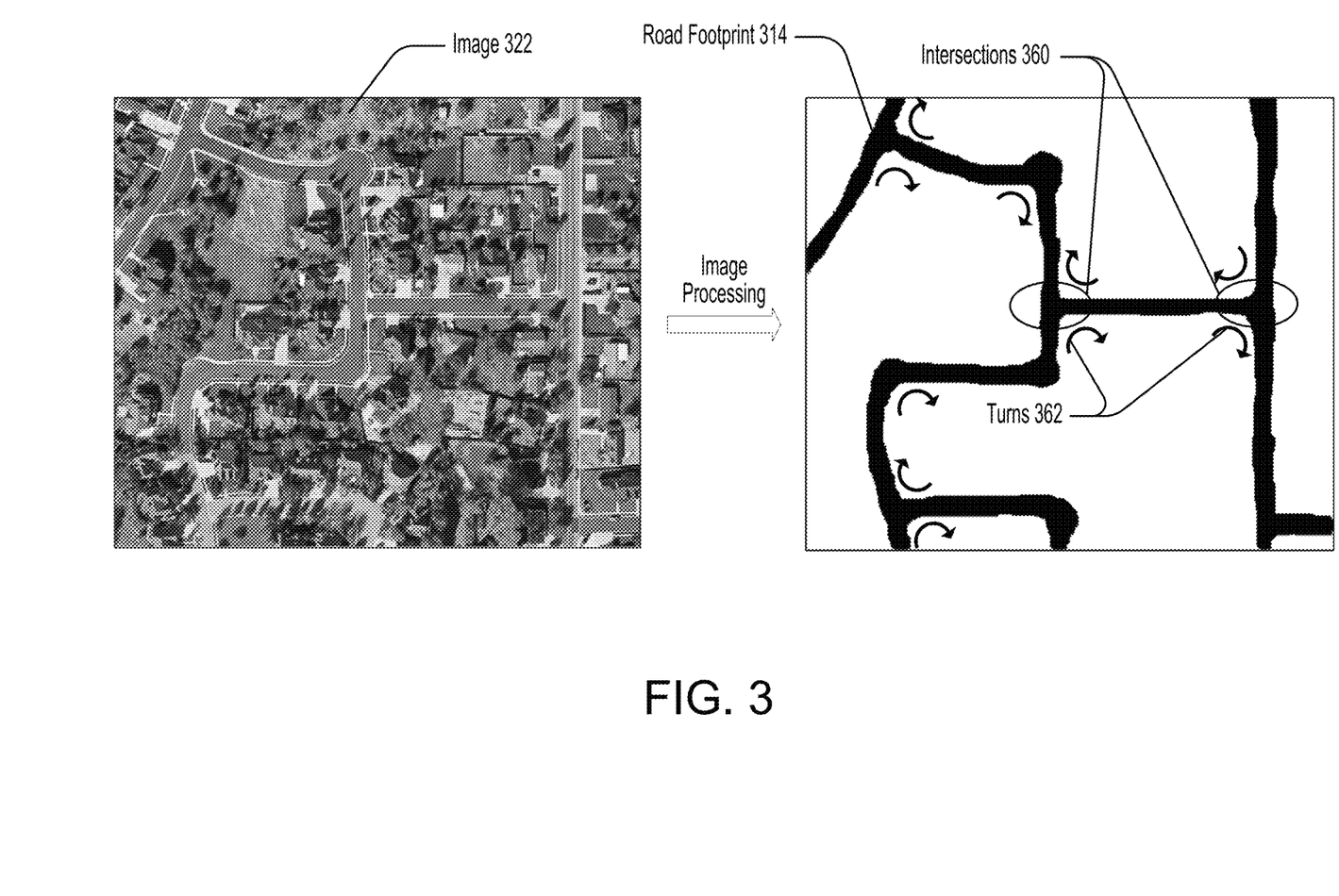
FIG. 3 illustrates an example of converting an image into a road footprint.

FIG. 3 illustrates an example of converting an image 322 into a road footprint 314, in accordance with some embodiments of the present disclosure. In the illustrated example, image 322 is an overhead image captured using satellite imaging technology. In some embodiments, image 322 may be provided to a machine-learning model that is pre-trained to detect the footprints of roads and other drivable surfaces to predict road footprint 314. In some implementations, the machine-learning model may be trained specifically to receive satellite images as input and to predict footprints of roads. Furthermore, the machine-learning model may distinguish between roads intended for driving and roads intended for parking, and may further identify structures such as buildings, walls, poles, and signs that would be completely impassable by vehicles.

In some instances, road footprint 314 may be analyzed to identify one or more intersections 360 and turns 362. While the illustrated example only shows right-hand turns, it is understood that turns 362 may include right-hand turns and/or left-hand turns. Furthermore, turns 362 may be identified in sections of road footprint 314 that do not correspond to intersections (e.g., in locations where the road simply bends).

Figure 4A:
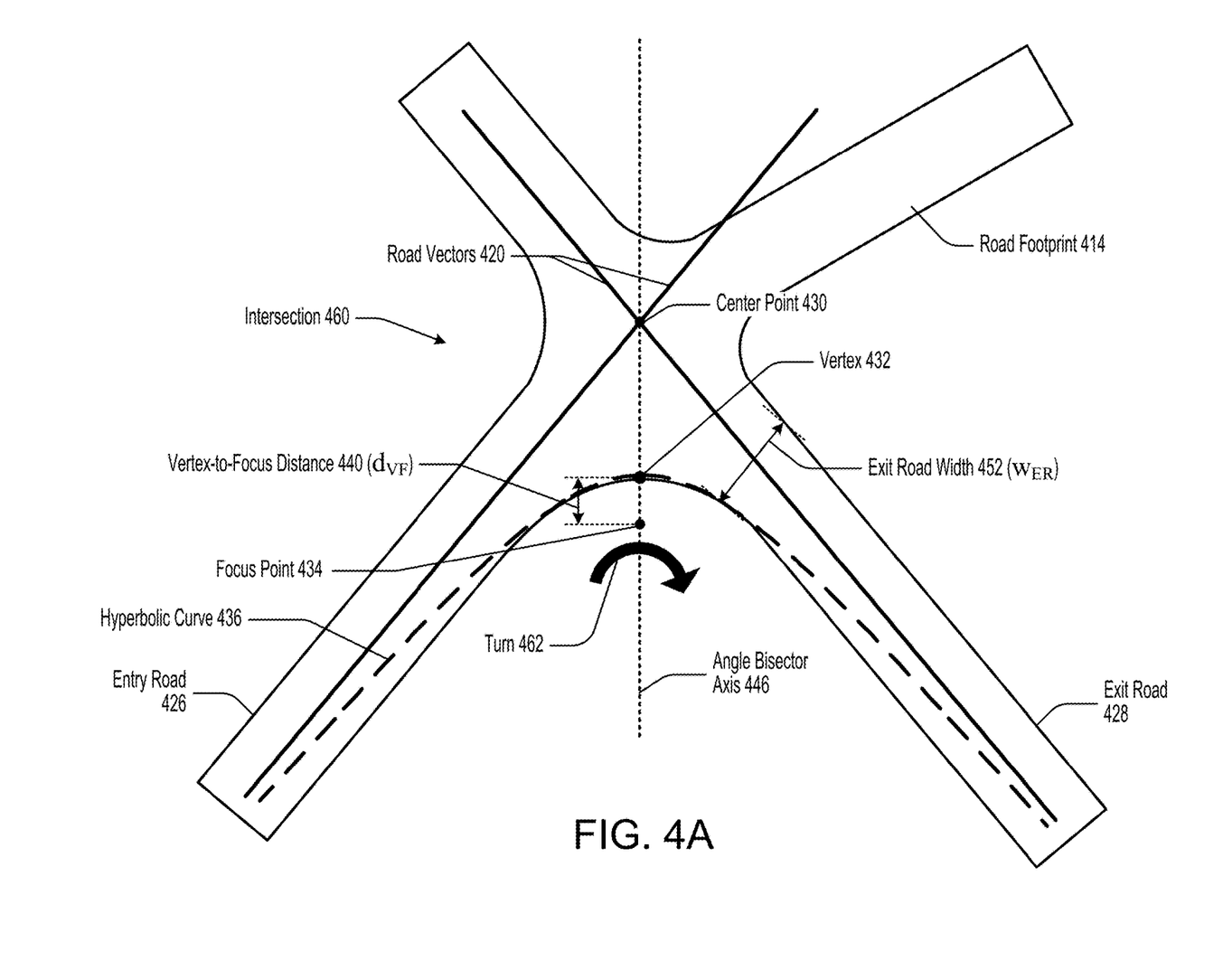
FIGS. 4A-4C illustrate example steps for determining a turn difficulty associated with a turn of an intersection.
Figure 4B:
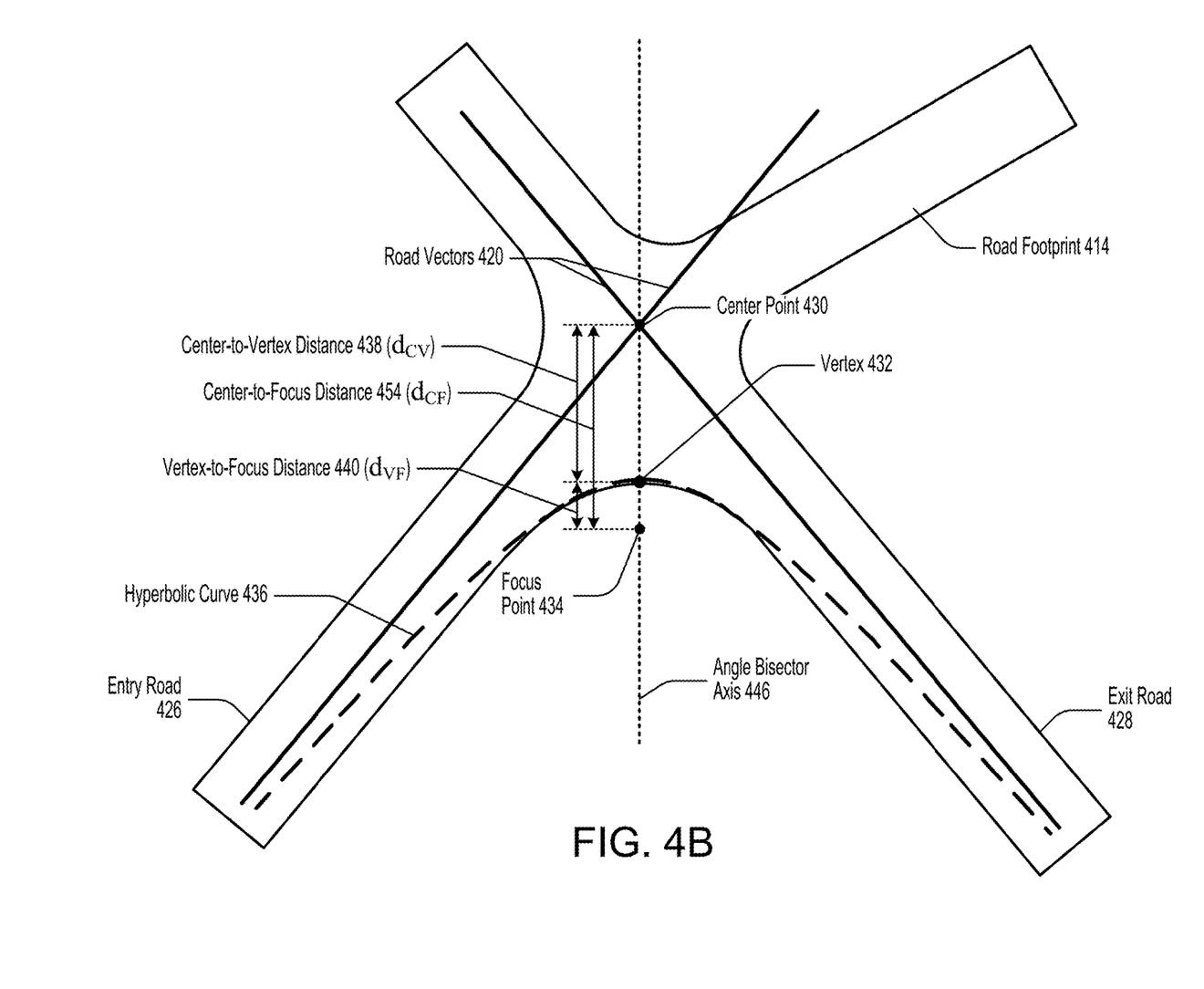
Figure 4C:
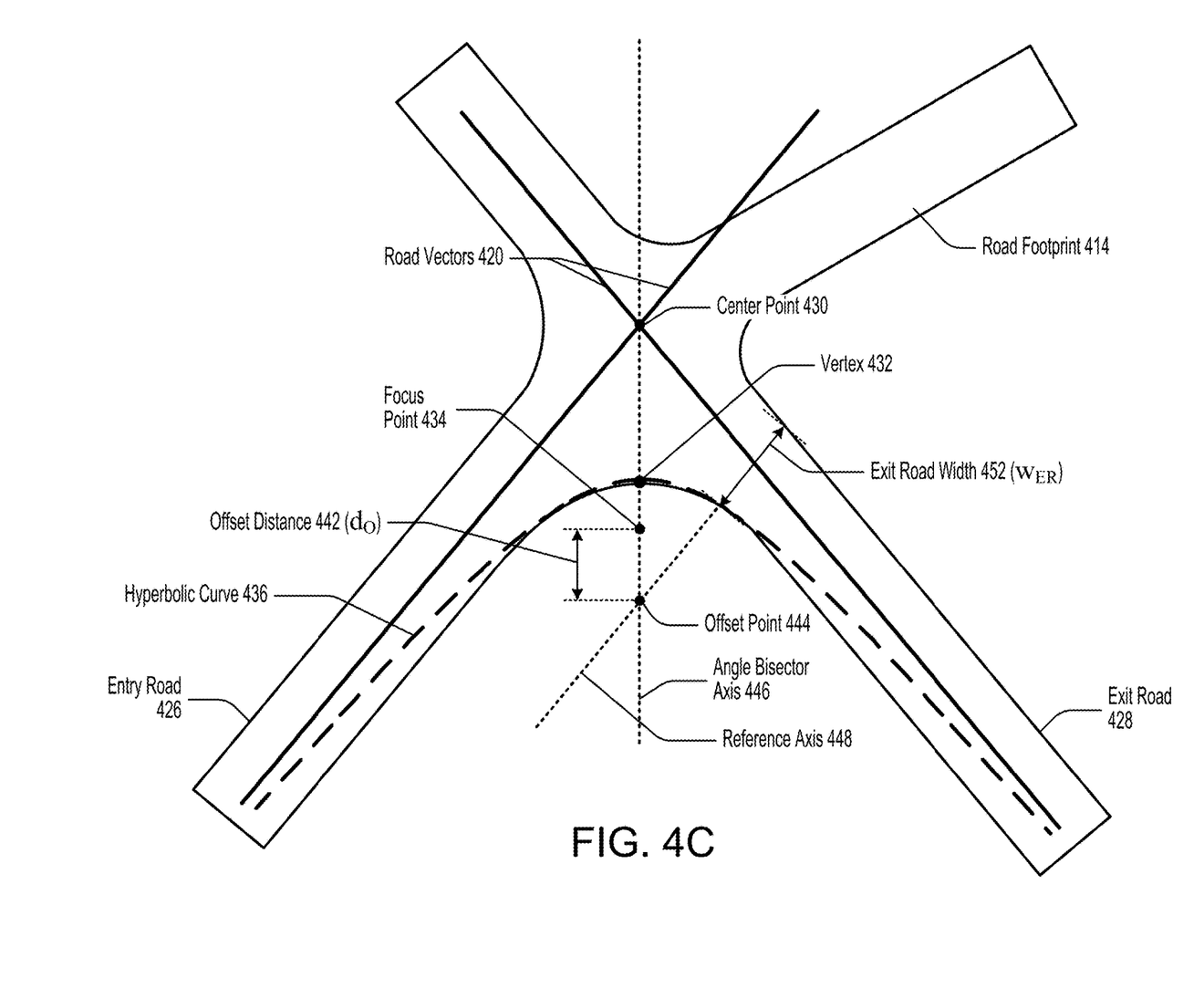

FIGS. 4A-4C illustrate example steps for determining a turn difficulty associated with a turn 462 of an intersection 460, in accordance with some embodiments of the present disclosure. The turn difficulty may be determined using one or more distances calculated based on a road footprint 414 of intersection 460 that is predicted using an overhead image. The distance(s) used to determine the turn difficulty may include, in some embodiments, a vertex-to-focus distance 440 ($d_{VF}$) and/or an exit road width 452 ($w_{ER}$).

Example steps for calculating vertex-to-focus distance 440 ($d_{VF}$) and/or an exit road width 452 may include one or more of the following. First, intersection 460 and/or turn 462 may be identified from road footprint 414. Furthermore, an entry road 426 and an exit road 428 associated with turn 462 may be identified from road footprint 414. Next, a set of road vectors 420 for entry road 426 and exit road 428 may be calculated based on the angles of the roads within road footprint 414. A center point 430 may be calculated at the intersection between road vectors 420. An angle bisector axis 446 may be calculated as the angle bisector of road vectors 420, i.e., the angle bisector of the turn angle formed by road vectors 420. A vertex 432 may be calculated at the intersection between angle bisector axis 446 and the edge of road footprint 414 along the inside of turn 462.

Next, a hyperbolic curve 436 may be fitted to road vectors 420 and vertex 432, where road vectors 420 serve as the asymptotes of hyperbolic curve 436 and vertex 432 serves as the vertex of hyperbolic curve 436. In some examples, hyperbolic curve 436 is constrained to pass through vertex 432 and to converge to road vectors 420 at the outer limits of hyperbolic curve 436 (partially shown in FIG. 4A). By fitting hyperbolic curve 436, a focus point 434 (or simply "focus") is mathematically computed from the equation for a hyperbola.

In reference to FIG. 4B, vertex-to-focus distance 440 ($d_{VF}$) may be calculated as the distance between vertex 432 and focus point 434. To facilitate the calculation, in some examples, a center-to-focus distance 454 ($d_{CF}$) and/or a center-to-vertex distance 438 ($d_{CV}$) may be calculated, where center-to-focus distance 454 ($d_{CF}$) is the distance between center point 430 and focus point 434, and center-to-vertex distance 458 ($d_{CV}$) is the distance between center point 430 and vertex 432. From these quantities, vertex-to-focus distance 440 ($d_{VF}$) may be calculated as the difference between center-to-focus distance 454 ($d_{CF}$) and center-to-vertex distance 458 ($d_{CV}$).

In reference to FIG. 4C, exit road width 452 ($w_{ER}$) may be calculated as the distance across exit road 428 along a reference axis 448. In some examples, reference axis 448 may be parallel to road vector 420 for entry road 426 and may pass through an offset point 444 that is positioned along angle bisector axis 446 at an offset distance 442 ($d_O$) from focus point 434 away from road footprint 414. In some embodiments, offset distance 442 ($d_O$) may be a predetermined value. In various embodiments, offset distance 442 ($d_O$) may be equal to 2 meters, 4 meters, 6 meters, 8 meters, 10 meters, 20 meters, or the like. In general, it may be desirable that offset distance 442 ($d_O$) is large enough to be roughly independent of vertex-to-focus distance 440 ($d_{VF}$) and small enough so that exit road width 452 ($w_{ER}$) is captured at a position where the vehicle would still be turning.

Figure 5A:
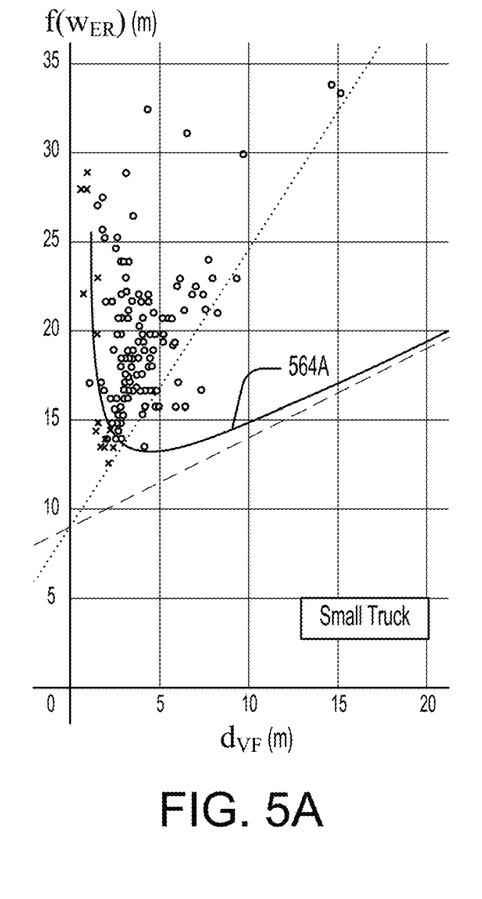
FIGS. 5A-5C illustrate example results with using the vertex-to-focus distance and exit road width to determine turn difficulty.
Figure 5B:
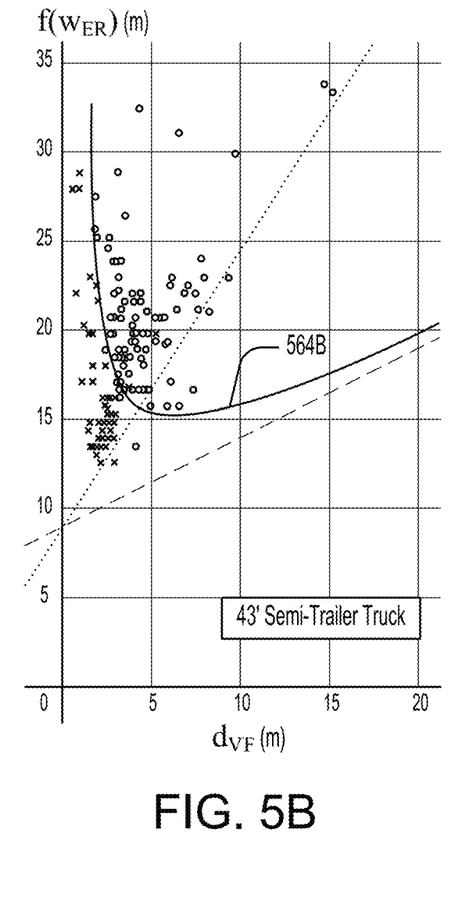
Figure 5C:
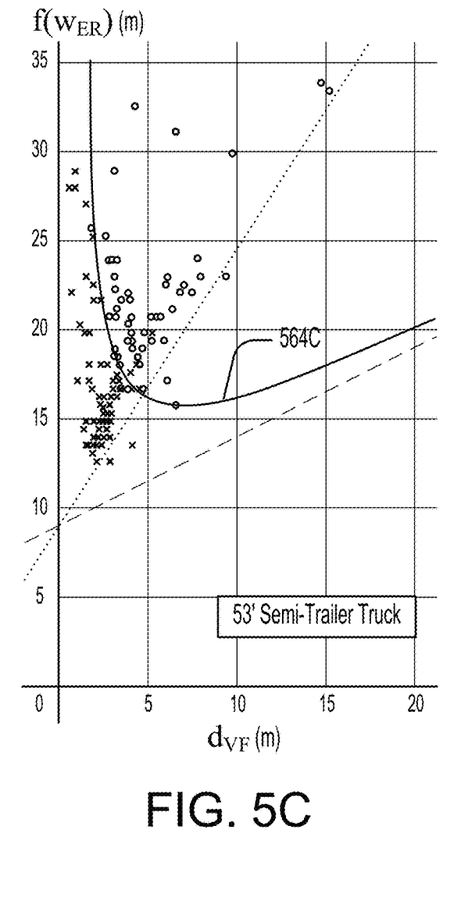

FIGS. 5A-5C illustrate example results with using vertex-to-focus distance $d_{VF}$ and exit road width $w_{ER}$ to determine turn difficulty, in accordance with some embodiments of the present disclosure. In the illustrated examples, the vertex-to-focus distance $d_{VF}$ and the exit road width $w_{ER}$ (specifically, a function of $w_{ER}$, $f(w_{ER})$) were computed for several turns that were attempted by three types of vehicles, including a small truck (FIG. 5A), a 43 foot semi-trailer truck (FIG. 5B), and a 53 foot semi-trailer truck (FIG. 5C). Turns that were able to be successfully completed are plotted with circles at their ($d_{VF}$, $f(w_{ER})$) coordinates, and turns that were unable to be completed are plotted with "X" symbols at their ($d_{VF}$, $f(w_{ER})$) coordinates.

As shown in FIGS. 5A-5C, the success of a particular turn can be accurately determined based on the turn's $d_{VF}$ and $w_{ER}$ coordinates by employing boundary lines 564 that separates successful turns and unsuccessful turns. Each of boundary lines 564 may be specific to the type of vehicle. However, as shown in FIGS. 5A-5C, boundary lines 564 may share a similar shape and may have a similar underlying formula. In a particular implementation, the equation for each of boundary lines 564 is expressed as:

$$y = \frac{-5.949\sqrt{100x^2 - 4.24a^2} + 61.600x}{4.237} + 9$$

where a is a parameter that is solved for based on experimental data acquired using different vehicles. In some instances, a is solved for using a least-squares fitting.

Figure 6:
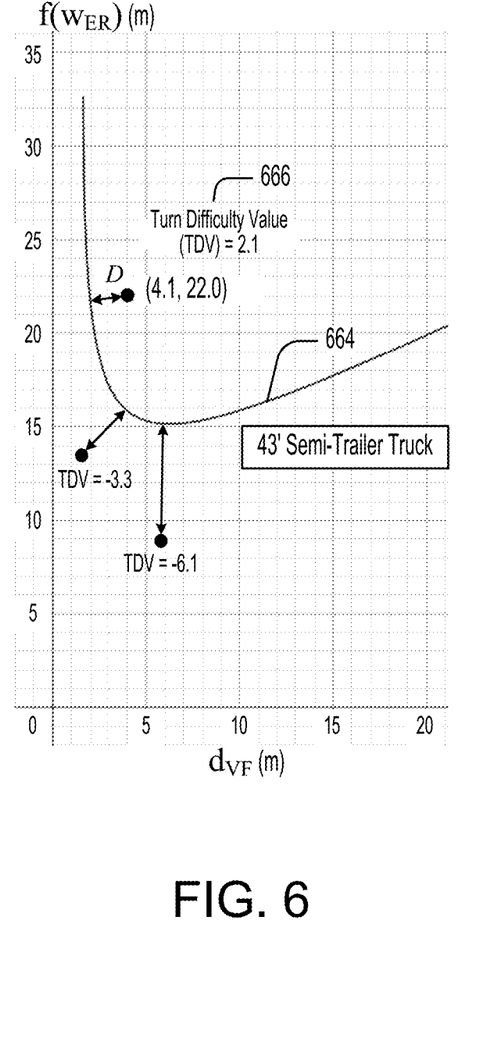
FIG. 6 illustrates an example calculation of a turn difficulty value using a boundary line.

FIG. 6 illustrates an example calculation of a turn difficulty value using a boundary line 664, in accordance with some embodiments of the present disclosure. With boundary line 664 having been predetermined for 43-foot semi-trailer trucks (with a=7.9), a turn may be identified having coordinates for vertex-to-focus distance $d_{VF}$ and exit road width $w_{ER}$ (specifically, a function of $w_{ER}$, $f(w_{ER})$) of (4.1, 22.0), respectively. A distance D between boundary line 664 and the ($d_{VF}$, $f(w_{ER})$) coordinates may be determined and used to calculate a turn difficulty value 666 of 2.1. In some examples, distances D from boundary line 664 on one side of boundary line 664 (e.g., the top right, or the "success side") may decrease (or increase) the turn difficulty value for the corresponding turn, and distances D from boundary line 664 on the other side of boundary line 664 (e.g., the bottom left, or the "failure side") may increase (or decrease) the turn difficulty value for the corresponding turn.

In some examples, turns having ($d_{VF}$, $f(w_{ER})$) coordinates directly on boundary line 664 may have a turn difficulty value of 0, 1, or some other predetermined value, and turns having ($d_{VF}$, $f(w_{ER})$) coordinates at a distance from boundary line 664 may have an increased or decreased turn difficulty value based on that distance. In some examples, turns having ($d_{VF}$, $f(w_{ER})$) coordinates anywhere on the success side of boundary line 664 may have a turn difficulty value less than or equal to (or greater than or equal to) a first predetermined value (e.g., 0) and turns having ($d_{VF}$, $f(w_{ER})$) coordinates anywhere on the failure side of boundary line 664 may have a turn difficulty value greater than or equal to (or less than or equal to) a second predetermined value (e.g., 10). Different calculation schemes for turn difficulty values may be employed to properly incentivize or disincentivize inclusion of particular turns when generating navigation routes.

Figure 7:
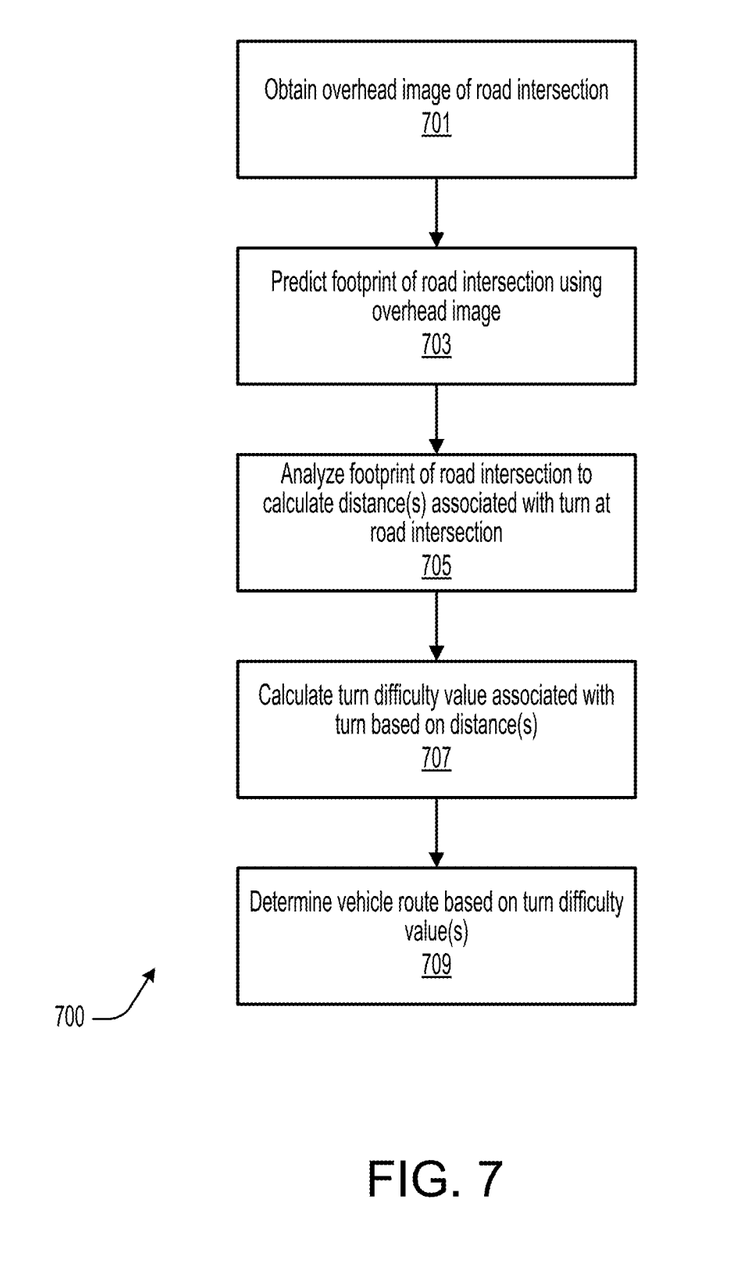
FIG. 7 illustrates a method of determining turn difficulty.

FIG. 7 illustrates a method 700 of determining turn difficulty, in accordance with some embodiments of the present disclosure. Steps of method 700 may be performed in any order and/or in parallel, and one or more steps of method 700 may be optionally performed. One or more steps of method 700 may be performed by one or more processors, such as those included in a navigation computer located at a vehicle or remote from a vehicle. Method 700 may be implemented as a computer-readable medium or computer program product comprising instructions which, when the program is executed by one or more processors, cause the one or more processors to carry out the steps of method 700.

At step 701, an overhead image (e.g., image 322) of a road intersection (e.g., intersections 360, 460) is obtained. The overhead image may be captured using satellite imaging technology, aerial imaging technology, among other possibilities. The overhead image may be obtained (e.g., received) at a vehicle (e.g., vehicles 110, 210) or at a navigation server remote from the vehicle.

At step 703, a footprint (e.g., road footprints 214, 314, 414) of the road intersection is predicted using the overhead image. The footprint of the road intersection may be predicted using a machine-learning model, such as an artificial neural network. The machine-learning model may be pre-trained to predict footprints of roads and road intersections based on an image input. The footprint of the road intersection may be predicted at the vehicle or at the navigation server remote from the vehicle.

At step 705, the footprint of the road intersection is analyzed to calculate one or more distances associated with a turn (e.g., turns 162, 262, 362, 462) at the road intersection. The one or more distances may include a distance based on the inside turning space of the turn, such as a vertex-to-focus distance (e.g., vertex-to-focus distance 440), and/or a width of an exit road (e.g., exit road width 452). Analyzing the footprint of the road intersection may include identifying an entry road (e.g., entry road 426) and an exit road (e.g., exit road 428) associated with the turn and calculating a set of road vectors (e.g., road vectors 220, 420) for the roads, including a first road vector for the entry road and a second road vector for the exit road that intersect at a center point (e.g., center point 430). Analyzing the footprint of the road intersection may include calculating a vertex (e.g., vertex 432) based on the set of road vectors and the footprint of the road intersection. The vertex may be positioned along an angle bisector axis (e.g., angle bisector axis 446) that bisects a turn angle (e.g., turn angles 216) formed by the set of road vectors.

In some examples, analyzing the footprint of the road intersection may include fitting a hyperbolic curve (e.g., hyperbolic curve 436) to the footprint of the road intersection based on the set of road vectors and the vertex. Fitting the hyperbolic curve may include finding a focus point (e.g., focus point 434) associated with the hyperbolic curve. Analyzing the footprint of the road intersection may include calculating the vertex-to-focus distance based on the vertex and the focus point by, for example, determining the distance between the vertex and the focus point. Analyzing the footprint of the road intersection may include calculating an offset point (e.g., offset point 444) that is positioned along the angle bisector axis at an offset distance (e.g., offset distance 442) from the offset point, calculating a reference axis (e.g., reference axis 448) that passes through the offset point and is parallel to the first road vector, and calculating the width of the exit road along the reference axis. The footprint of the road intersection may be analyzed at the vehicle or at the navigation server remote from the vehicle.

In some embodiments, the one or more distances may include a first distance. The first distance may be based on the inside turning space of the turn. In various examples, the first distance may be the distance between the center point and the vertex, the distance between the center point and the focus point, the distance between the vertex and the focus point, or any distance based thereon. In various examples, the first distance may be based on a distance calculated along the angle bisector axis. In some embodiments, the one or more distances may include a second distance. The second distance may be based on the width of the exit road. In various examples, the second distance may be the distance across the exit road along the reference axis, the distance between the offset point and the outer edge of the exit road along the reference axis (therefore including the width of the exit road), the distance across the exit road along a perpendicular axis to the road vector for the exit road, or any distance based thereon. In some embodiments, the one or more distances may include the first distance and/or the second distance (e.g., only the first distance, only the second distance, or both the first distance and the second distance).

At step 707, a turn difficulty value (e.g., turn difficulty value 666) associated with the turn is calculated based on the one or more distances for the turn. In some examples, the one or more distances are compared to one or more thresholds to calculate the turn difficulty value. In some examples, the one or more distances are used as coordinates and are compared to a line boundary (e.g., boundary lines 464, 564) and/or are inputted into a function to determine the turn difficulty value. The turn difficulty value may be calculated further based on one or more characteristics of the vehicle, such as the length of the vehicle, the width of vehicle, the relative lengths of the tractor and trailer units of the vehicle, the positions of the axles of the vehicle, among other factors. The turn difficulty value may be binary (e.g., 1 for difficult turns and 0 for easy turns) or may take on a range of values. The turn difficulty value may be calculated at the vehicle or at the navigation server remote from the vehicle.

At step 709, a vehicle route is determined based on the turn difficulty value or a set of turn difficulty values that include the turn difficulty value. For example, the vehicle route may be determined between a start location and an end location (which may be received as input from a user), and may include a set of selected paths and turns. In some instances, the selected turns in the vehicle route may be selected so that their corresponding turn difficulty values are each below a maximum turn difficulty value or above a minimum turn difficulty value (which may be received as input from a user). In some examples, the vehicle route may be wirelessly transmitted from a remote server (e.g., a navigation server) to the vehicle for which the vehicle route is determined, and may be displayed at the vehicle and/or used to control the vehicle (e.g., using a self-driving program). The vehicle route may be determined at the vehicle or at the navigation server remote from the vehicle.

Figure 8:
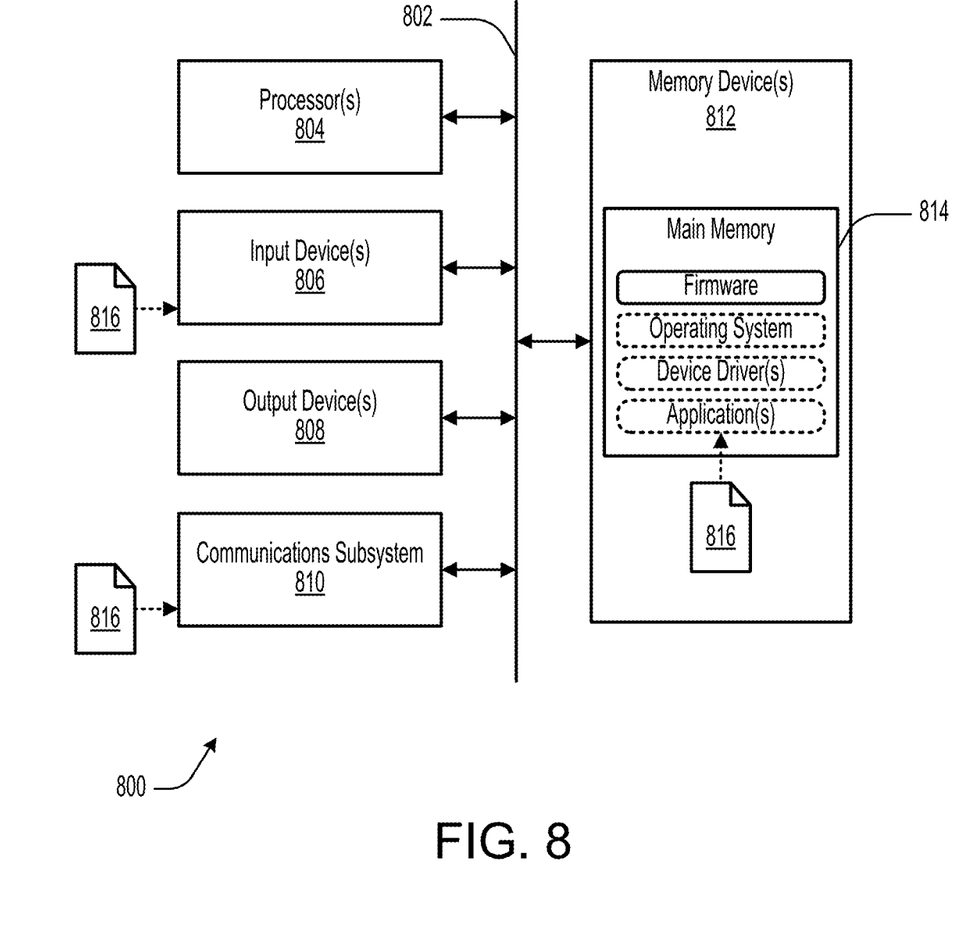
FIG. 8 illustrates an example computer system comprising various hardware elements.

FIG. 8 illustrates an example computer system 800 comprising various hardware elements, in accordance with some embodiments of the present disclosure. Computer system 800 may be incorporated into or integrated with devices described herein and/or may be configured to perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

In the illustrated example, computer system 800 includes a communication medium 802, one or more processor(s) 804, one or more input device(s) 806, one or more output device(s) 808, a communications subsystem 810, and one or more memory device(s) 812. Computer system 800 may be implemented using various hardware implementations and embedded system technologies. For example, one or more elements of computer system 800 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 800 may be communicatively coupled via communication medium 802. While communication medium 802 is illustrated as a single connection for purposes of clarity, it should be understood that communication medium 802 may include various numbers and types of communication media for transferring data between hardware elements. For example, communication medium 802 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 802 may include one or more buses that connect the pins of the hardware elements of computer system 800. For example, communication medium 802 may include a bus that connects processor(s) 804 with main memory 814, referred to as a system bus, and a bus that connects main memory 814 with input device(s) 806 or output device(s) 808, referred to as an expansion bus. The system bus may itself consist of several buses, including an address bus, a data bus, and a control bus. The address bus may carry a memory address from processor(s) 804 to the address bus circuitry associated with main memory 814 in order for the data bus to access and carry the data contained at the memory address back to processor(s) 804. The control bus may carry commands from processor(s) 804 and return status signals from main memory 814. Each bus may include multiple wires for carrying multiple bits of information and each bus may support serial or parallel transmission of data.

Processor(s) 804 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 804 may include one or more multi-core processors, in which each core may read and execute program instructions concurrently with the other cores, increasing speed for programs that support multithreading.

Input device(s) 806 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 806 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 808 may include one or more of various devices that convert information into human-readable form, such as without limitation a display device, a speaker, a printer, a haptic or tactile device, and/or the like. Output device(s) 808 may also include devices for writing to removable storage devices or other removable media, such as those described in reference to input device(s) 806. Output device(s) 808 may also include various actuators for causing physical movement of one or more components. Such actuators may be hydraulic, pneumatic, electric, and may be controlled using control signals generated by computer system 800.

Communications subsystem 810 may include hardware components for connecting computer system 800 to systems or devices that are located external to computer system 800, such as over a computer network. In various embodiments, communications subsystem 810 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 812 may include the various data storage devices of computer system 800. For example, memory device(s) 812 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 804 and memory device (s) 812 are illustrated as being separate elements, it should be understood that processor(s) 804 may include varying levels of on-processor memory, such as processor registers and caches that may be utilized by a single processor or shared between multiple processors.

Memory device(s) 812 may include main memory 814, which may be directly accessible by processor(s) 804 via the address and data buses of communication medium 802. For example, processor(s) 804 may continuously read and execute instructions stored in main memory 814. As such, various software elements may be loaded into main memory 814 to be read and executed by processor(s) 804 as illustrated in FIG. 8. Typically, main memory 814 is volatile memory, which loses all data when power is turned off and accordingly needs power to preserve stored data. Main memory 814 may further include a small portion of non-volatile memory containing software (e.g., firmware, such as BIOS) that is used for reading other software stored in memory device(s) 812 into main memory 814. In some embodiments, the volatile memory of main memory 814 is implemented as RAM, such as dynamic random-access memory (DRAM), and the non-volatile memory of main memory 814 is implemented as read-only memory (ROM), such as flash memory, erasable programmable read-only memory (EPROM), or electrically erasable programmable read-only memory (EEPROM).

Computer system 800 may include software elements, shown as being currently located within main memory 814, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 816, which are executable by computer system 800. In one example, such instructions 816 may be received by computer system 800 using communications subsystem 810 (e.g., via a wireless or wired signal that carries instructions 816), carried by communication medium 802 to memory device(s) 812, stored within memory device(s) 812, read into main memory 814, and executed by processor(s) 804 to perform one or more steps of the described methods. In another example, instructions 816 may be received by computer system 800 using input device(s) 806 (e.g., via a reader for removable media), carried by communication medium 802 to memory device(s) 812, stored within memory device(s) 812, read into main memory 814, and executed by processor(s) 804 to perform one or more steps of the described methods.

In some embodiments of the present disclosure, instructions 816 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 800. For example, the non-transitory computer-readable medium may be one of memory device(s) 812 (as shown in FIG. 8). In some cases, the non-transitory computer-readable medium may be separate from computer system 800. In one example, the non-transitory computer-readable medium may be a removable medium provided to input device(s) 806 (as shown in FIG. 8), such as those described in reference to input device(s) 806, with instructions 816 being read into computer system 800 by input device(s) 806. In another example, the non-transitory computer-readable medium may be a component of a remote electronic device, such as a mobile phone, that may wirelessly transmit a data signal that carries instructions 816 to computer system 800 and that is received by communications subsystem 810 (as shown in FIG. 8).

Instructions 816 may take any suitable form to be read and/or executed by computer system 800. For example, instructions 816 may be source code (written in a human-readable programming language such as Java, C, C++, C #, Python), object code, assembly language, machine code, microcode, executable code, and/or the like. In one example, instructions 816 are provided to computer system 800 in the form of source code, and a compiler is used to translate instructions 816 from source code to machine code, which may then be read into main memory 814 for execution by processor(s) 804. As another example, instructions 816 are provided to computer system 800 in the form of an executable file with machine code that may immediately be read into main memory 814 for execution by processor(s) 804. In various examples, instructions 816 may be provided to computer system 800 in encrypted or unencrypted form, compressed or uncompressed form, as an installation package or an initialization for a broader software deployment, among other possibilities.

In one aspect of the present disclosure, a system (e.g., computer system 800) is provided to perform methods in accordance with various embodiments of the present disclosure. For example, some embodiments may include a system comprising one or more processors (e.g., processor(s) 804) that are communicatively coupled to a non-transitory computer-readable medium (e.g., memory device(s) 812 or main memory 814). The non-transitory computer-readable medium may have instructions (e.g., instructions 816) stored therein that, when executed by the one or more processors, cause the one or more processors to perform the methods described in the various embodiments.

In another aspect of the present disclosure, a computer-program product that includes instructions (e.g., instructions 816) is provided to perform methods in accordance with various embodiments of the present disclosure. The computer-program product may be tangibly embodied in a non-transitory computer-readable medium (e.g., memory device(s) 812 or main memory 814). The instructions may be configured to cause one or more processors (e.g., processor(s) 804) to perform the methods described in the various embodiments.

In another aspect of the present disclosure, a non-transitory computer-readable medium (e.g., memory device(s) 812 or main memory 814) is provided. The non-transitory computer-readable medium may have instructions (e.g., instructions 816) stored therein that, when executed by one or more processors (e.g., processor(s) 804), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
    obtaining an overhead image of a road intersection;
    predicting a footprint of the road intersection using the overhead image;
    analyzing the footprint of the road intersection to calculate one or more distances associated with a turn at the road intersection, wherein analyzing the footprint of the road intersection includes:
        identifying an entry road and an exit road associated with the turn based on the footprint of the road intersection;
        calculating a set of road vectors based on the footprint of the road intersection, the set of road vectors including a first road vector for the entry road and a second road vector for the exit road; and
        fitting a hyperbolic curve based on the set of road vectors, wherein the hyperbolic curve intersects an edge of the road intersection, and wherein the one or more distances are calculated based on a focus point of the hyperbolic curve; and
    calculating a turn difficulty value associated with the turn based on the one or more distances for the turn.

2. The method of claim 1, further comprising:
    determining a vehicle route based on a set of turn difficulty values associated with a set of turns at a set of road intersections, wherein the set of turn difficulty values, the set of turns, and the set of road intersections include the turn difficulty value, the turn, and the road intersection, respectively.

3. The method of claim 2, further comprising:
    wirelessly transmitting the vehicle route or the turn difficulty value to a vehicle.

4. The method of claim 1, wherein the turn difficulty value is calculated further based on one or more characteristics of a vehicle.

5. The method of claim 1, wherein analyzing the footprint of the road intersection further includes:
    calculating a vertex based on the set of road vectors and the footprint of the road intersection, wherein the hyperbolic curve is fitted further;
    based on the vertex.

6. The method of claim 5, wherein analyzing the footprint of the road intersection further includes:
    calculating a vertex-to-focus distance based on the vertex and the focus point, wherein the one or more distances includes the vertex-to-focus distance.

7. The method of claim 5, wherein the one or more distances includes a width of the exit road.

8. The method of claim 1, wherein the footprint of the road intersection is predicted using a trained machine-learning model using the overhead image.

9. A non-transitory computer-readable medium comprising instructions that, when executed by one or more processors, cause the one or more processors to perform operations comprising:
    obtaining an overhead image of a road intersection;
    predicting a footprint of the road intersection using the overhead image;
    analyzing the footprint of the road intersection to calculate one or more distances associated with a turn at the road intersection, wherein analyzing the footprint of the road intersection includes:
        identifying an entry road and an exit road associated with the turn based on the footprint of the road intersection;
        calculating a set of road vectors based on the footprint of the road intersection, the set of road vectors including a first road vector for the entry road and a second road vector for the exit road; and
        fitting a hyperbolic curve based on the set of road vectors, wherein the hyperbolic curve intersects an edge of the road intersection, and wherein the one or more distances are calculated based on a focus point of the hyperbolic curve; and
    calculating a turn difficulty value associated with the turn based on the one or more distances for the turn.

10. The non-transitory computer-readable medium of claim 9, wherein the operations further comprise:
    determining a vehicle route based on a set of turn difficulty values associated with a set of turns at a set of road intersections, wherein the set of turn difficulty values, the set of turns, and the set of road intersections include the turn difficulty value, the turn, and the road intersection, respectively.

11. The non-transitory computer-readable medium of claim 10, wherein the operations further comprise:
    wirelessly transmitting the vehicle route or the turn difficulty value to a vehicle.

12. The non-transitory computer-readable medium of claim 9, wherein the turn difficulty value is calculated further based on one or more characteristics of a vehicle.

13. The non-transitory computer-readable medium of claim 9, wherein analyzing the footprint of the road intersection further includes:
calculating a vertex based on the set of road vectors and the footprint of the road intersection, wherein the hyperbolic curve is fitted further based on the vertex.

14. The non-transitory computer-readable medium of claim 13, wherein analyzing the footprint of the road intersection further includes:
calculating a vertex-to-focus distance based on the vertex and the focus point, wherein the one or more distances includes the vertex-to-focus distance.

15. The non-transitory computer-readable medium of claim 13, wherein the one or more distances includes a width of the exit road.

16. The non-transitory computer-readable medium of claim 9, wherein the footprint of the road intersection is predicted using a trained machine-learning model using the overhead image.

17. A system comprising:
one or more processors; and
a computer-readable medium comprising instructions that, when executed by the one or more processors, cause the one or more processors to perform operations comprising:
obtaining an overhead image of a road intersection;
predicting a footprint of the road intersection using the overhead image;
analyzing the footprint of the road intersection to calculate one or more distances associated with a turn at the road intersection, wherein analyzing the footprint of the road intersection includes:
identifying an entry road and an exit road associated with the turn based on the footprint of the road intersection;
calculating a set of road vectors based on the footprint of the road intersection, the set of road vectors including a first road vector for the entry road and a second road vector for the exit road; and
fitting a hyperbolic curve based on the set of road vectors, wherein the hyperbolic curve intersects an edge of the road intersection, and wherein the one or more distances are calculated based on a focus point of the hyperbolic curve; and
calculating a turn difficulty value associated with the turn based on the one or more distances for the turn.

18. The system of claim 17, wherein the operations further comprise:
determining a vehicle route based on a set of turn difficulty values associated with a set of turns at a set of road intersections, wherein the set of turn difficulty values, the set of turns, and the set of road intersections include the turn difficulty value, the turn, and the road intersection, respectively.

19. The system of claim 18, wherein the operations further comprise:
wirelessly transmitting the vehicle route or the turn difficulty value to a vehicle.

20. The system of claim 17, wherein the turn difficulty value is calculated further based on one or more characteristics of a vehicle.

* * * * *